(12) United States Patent
Hensel (10) Patent No.: US 11,427,149 B2
(45) Date of Patent: Aug. 30, 2022

(54) MOTOR VEHICLE

(71) Applicant: Bayerische Motoren Werke Aktiengesellschaft, Munich (DE)

(72) Inventor: Stefan Hensel, Puchheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/058,552

(22) PCT Filed: Apr. 30, 2019

(86) PCT No.: PCT/EP2019/061035
§ 371 (c)(1),
(2) Date: Nov. 24, 2020

(87) PCT Pub. No.: WO2019/228735
PCT Pub. Date: Dec. 5, 2019

(65) Prior Publication Data
US 2021/0122324 A1 Apr. 29, 2021

(30) Foreign Application Priority Data
May 30, 2018 (DE) ...................... 10 2018 208 562.5

(51) Int. Cl.
*B60R 21/231* (2011.01)
*B60R 21/207* (2006.01)
*B60R 21/2165* (2011.01)

(52) U.S. Cl.
CPC ...... *B60R 21/23138* (2013.01); *B60R 21/207* (2013.01); *B60R 21/2165* (2013.01);
(Continued)

(58) Field of Classification Search
None
See application file for complete search history.

(56) References Cited

U.S. PATENT DOCUMENTS 5,066,039 A 11/1991 Shitanoki et al.
5,564,735 A * 10/1996 Boy ........................ B60R 21/21
280/730.2
(Continued)

FOREIGN PATENT DOCUMENTS

CN 202896505 U 4/2013
CN 103158653 A 6/2013
(Continued)

OTHER PUBLICATIONS

PCT/EP2019/061035, International Search Report dated Jun. 19, 2019 (Two (2) pages).
(Continued)

*Primary Examiner* — Faye M Fleming
(74) *Attorney, Agent, or Firm* — Crowell & Moring LLP (57) ABSTRACT

A motor vehicle includes a body that forms a vehicle interior, where a front seat row and a rear seat row are formed in the vehicle interior. A rear seat of the rear seat row is disposed adjacent to a side wall of the body and the rear seat has a backrest. A side part of the rear seat is disposed between the backrest and the side wall. An airbag module is disposed in the side part and extends approximately parallel to the backrest and at least over a length of the backrest and an airbag guide sack surrounds the airbag module. The airbag module and the airbag guide sack are fastened to a carrier shell and the carrier shell is attached to the body.

9 Claims, 7 Drawing Sheets

(52) U.S. Cl.
CPC ............... *B60R 2021/2078* (2013.01); *B60R 2021/23146* (2013.01)

(56) References Cited

U.S. PATENT DOCUMENTS

| | | | |
|---|---|---|---|
| 9,796,353 B2 * | 10/2017 | Fujiwara | B60R 21/2155 |
| 10,800,369 B2 * | 10/2020 | Hioda | B60R 21/26 |
| 10,829,076 B2 * | 11/2020 | Takahashi | B60R 21/21 |
| 2002/0140218 A1 | 10/2002 | Beasley, Jr. | |
| 2012/0200123 A1 | 8/2012 | Sosnowski et al. | |
| 2017/0066402 A1 | 3/2017 | Fujiwara | |
| 2018/0086299 A1 * | 3/2018 | Kalinowski | B60R 21/21 |
| 2019/0001914 A1 * | 1/2019 | Yaegashi | B60R 21/207 |
| 2019/0135218 A1 * | 5/2019 | Takahashi | B60R 21/207 |
| 2019/0168703 A1 * | 6/2019 | Sato | B60R 21/2338 |

FOREIGN PATENT DOCUMENTS

| | | |
|---|---|---|
| DE | 39 13 034 C2 | 11/1989 |
| DE | 10 2004 028 570 A1 | 2/2006 |
| DE | 10 2016 001 051 A1 | 7/2016 |
| EP | 1 100 698 B1 | 5/2001 |
| JP | 2009-143379 A | 7/2009 |

OTHER PUBLICATIONS

English-language Chinese Office Action issued in Chinese application No. 201980034825.6 dated May 25, 2022 (Six (6) pages).

\* cited by examiner

MOTOR VEHICLE

BACKGROUND AND SUMMARY OF THE INVENTION

The invention concerns a motor vehicle.

DE 39 13 034 C2 discloses an airbag for protecting a vehicle occupant. Usually, an airbag comprises a gas generator via which ignition occurs. Furthermore, a sleeve and an air sack may be provided.

The object of the invention is to provide a motor vehicle with at least one airbag device, wherein the airbag device has means which, on deployment of the airbag, allow a homogenous force distribution and targeted unfolding of the airbag.

A motor vehicle according to the invention has a body with a vehicle interior. A front seat row and at least one rear seat row are formed in the vehicle interior. A rear single seat or a rear seat of a seat bench is formed adjacent to a respective side wall of the body. The respective seat has a backrest with a seat part and in some cases a headrest. A side part is formed at least between the respective backrest and the adjacent side wall.

An airbag module is advantageously arranged in the respective side part and extends approximately parallel to the backrest and at least over the length of the backrest. The airbag module is surrounded by an airbag guide sack. The airbag module and the airbag guide sack arranged thereon are fastened to a carrier shell via fixing means. The carrier shell is attached to the body via fixing means.

In an advantageous embodiment, in an inflated state of an airbag sack of the airbag module, the airbag sack covers the thorax, or the thorax and pelvis, or the thorax and pelvis and head, or the thorax, pelvis and shoulders, or the pelvis of a person sitting on the respective seat, in particular in the vertical direction z and in the vehicle longitudinal direction x.

Advantageously, a respective opening of the airbag guide sack situated an upper end portion and/or at a lower end portion of the airbag guide sack is partially or completely closed by at least one seam.

In an advantageous embodiment, in addition to the respective upper seam at the upper end portion, and in addition to the respective lower seam at the lower end portion, depending on a necessary force distribution and a proposed unfolding of the airbag guide sack, the airbag guide sack is provided with at least one sacrificial seam which additionally completely or partially closes the respective opening.

On the cover, at least one tearing seam is formed opposite the proposed outlet point of the airbag sack.

In an advantageous embodiment, the carrier shell has an opening which points in the direction of the proposed outlet point of the airbag sack and the tearing seam of the cover.

Advantageously, the lower end portion of the airbag guide sack is divided into two regions.

The respective side part is advantageously attached to the body via fixing means, and the respective side part comprises a padding or similar which is covered by a cover.

In an advantageous embodiment, the airbag guide sack is made of a material corresponding to the airbag fabric or a comparable material, and the cover is made of a plastic material, leather, textile and/or textile leather (Alcantara).

Embodiments of the invention are described as an example below with reference to the drawings.

BRIEF DESCRIPTION OF THE DRAWINGS

FIG. 1B is an enlarged depiction of FIG. 1A in the region of the airbag, wherein FIG. 1B shows the fixing of the edges of the airbag guide sack to the cover and the position of the tearing seam in the cover;

FIG. 2B is an enlarged depiction of FIG. 2A in the region of the airbag, wherein FIG. 2B shows the fixing of the edges of the airbag guide sack and the position of the edges of the cover after tearing of the tearing seam due to activation of the airbag;

DETAILED DESCRIPTION OF THE DRAWINGS

Figure 1A:
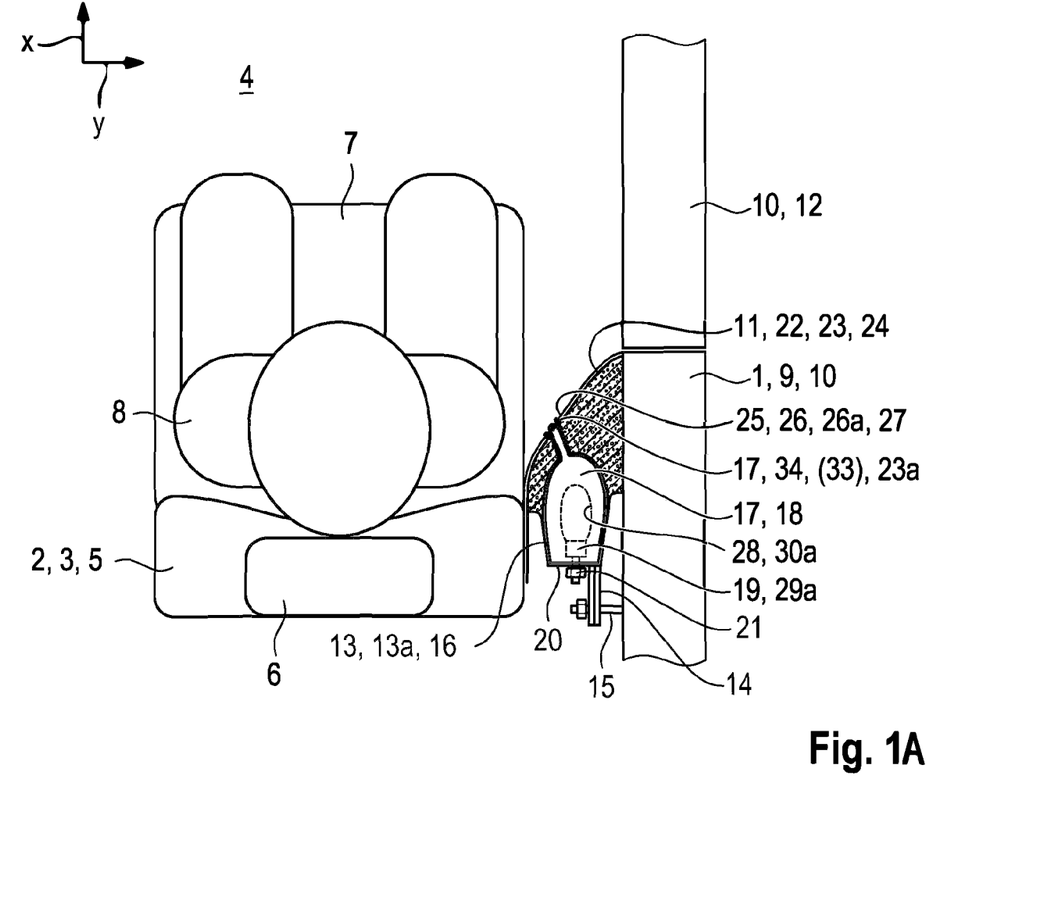
FIG. 1A shows a principle depiction in a top view of a rear seat of a second or third seat row in a vehicle interior of a motor vehicle, with an airbag in non-activated state.

FIG. 1A shows a principle depiction in a top view of a rear seat of a second or rear seat row 3 in a vehicle interior 4 of a motor vehicle 1. The rear seat 2 may be formed as a single seat or as a rear seat bench. The seat 2 has a backrest 5, a headrest 6 attached thereto, and a seat part 7.

A person 8 is sitting on the seat 2. Next to the backrest 5 in the direction of a side wall 9 of a body 10 of the motor vehicle 1, or in the vehicle transverse direction y, a side part 11 of the seat 2 is attached to the side wall 9. In the embodiment shown, a vehicle door 12 adjoins the side wall 9 towards the front in the vehicle longitudinal direction x.

The side part 11 has a carrier shell 13 or comparable fixing element for an airbag module 19. In the embodiment shown in FIG. 1A, the carrier shell 13 has a U-shaped cross-section. An opening 13a of the carrier shell 13 points in the direction of a tearing seam 26 of a cover 25.

Fixing means 14, such as for example a protruding tab 14, are formed on the carrier shell 13. The fixing means 14 are each attached to the body 10, in the embodiment shown to the side wall 9, via a further fixing means 15. An alternative design of the fixing of the carrier shell 13, the side part 11 or a comparable means for fixing the airbag module 19 to the body 10, is also possible.

In FIG. 1A, an airbag guide sack 17 is arranged in a cavity 16 of the carrier shell 13. An airbag module 19 in the interior 18 of the airbag guide sack 17 is shown in the non-ignited or non-activated state 29a.

In the embodiment shown, the airbag module 19 is attached to a portion 20 of the carrier shell 13 via fixing means 21, for example a screw connection. The airbag module 19 comprises the known components, such as for example a gas generator, a sleeve and/or an air sack.

A region 22 of the side part 11 surrounding the airbag guide sack 17 is filled, at least towards the vehicle interior 4, with a suitable padding 23 of foam or comparable material. An outer face 24 of the padding 23 pointing towards the seat 2 or vehicle interior 4 is covered with a suitable cover 25.

The cover 25 has a passage opening 25a which is delimited by opposing edge portions 31 and 32. The opposing edge portions 31 and 32 are connected together via a tearing seam 26 shown in FIG. 1A, i.e., the tearing seam 26 is in the closed state 26a.

Below the tearing seam 26 in the cover 25, a passage opening 23a is formed in the padding 23. Edge portions 33 and 34 of the airbag guide sack 17 are guided through the passage opening 23a in the padding 23. The tearing seam 26 and the passage opening 23a in the padding 23 form an outlet point 27 for an airbag sack 28 of the airbag module 19 in the inflated state 30b.

Figure 1B:
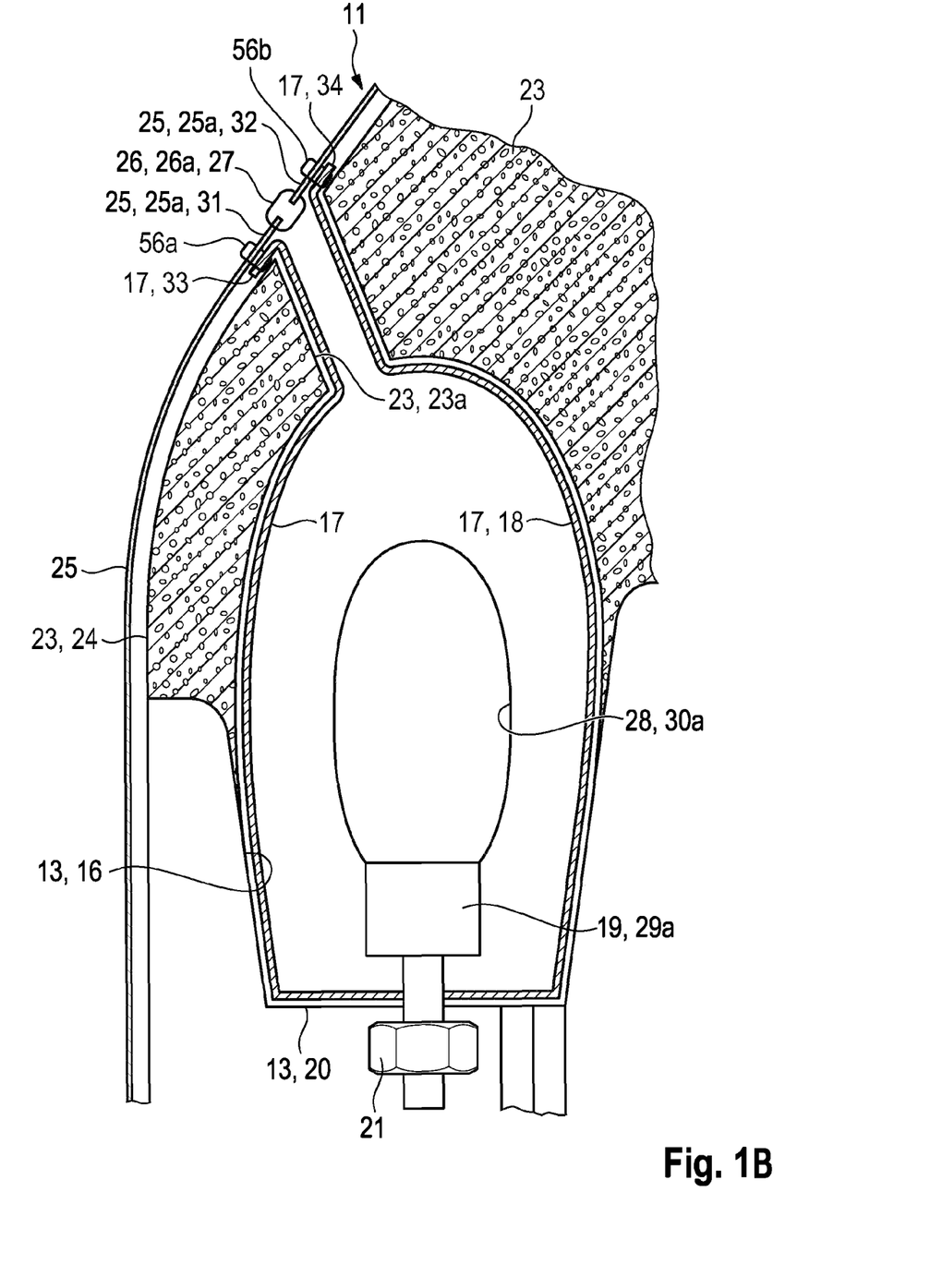

The edge portions 33 and 34 of the airbag guide sack 17 are attached to the edge portions 31 and 32 of the cover 29, as shown by the enlarged illustration in FIG. 1B. In FIGS. 1A and 1B, the airbag module 19 is shown in the non-activated state 29a with the airbag sack 28 in the non-inflated state 30a.

Figure 2A:
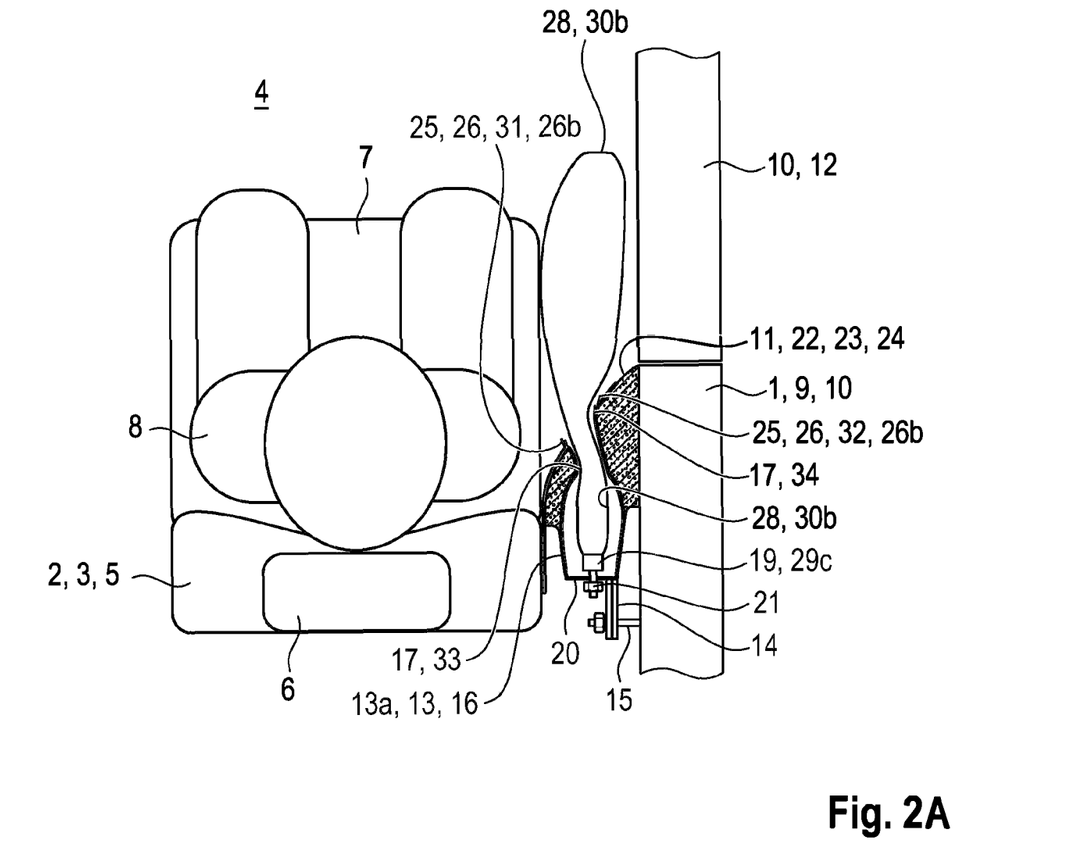
FIG. 2A shows a principle depiction corresponding to FIG. 1A with an airbag in activated state.
Figure 2B:
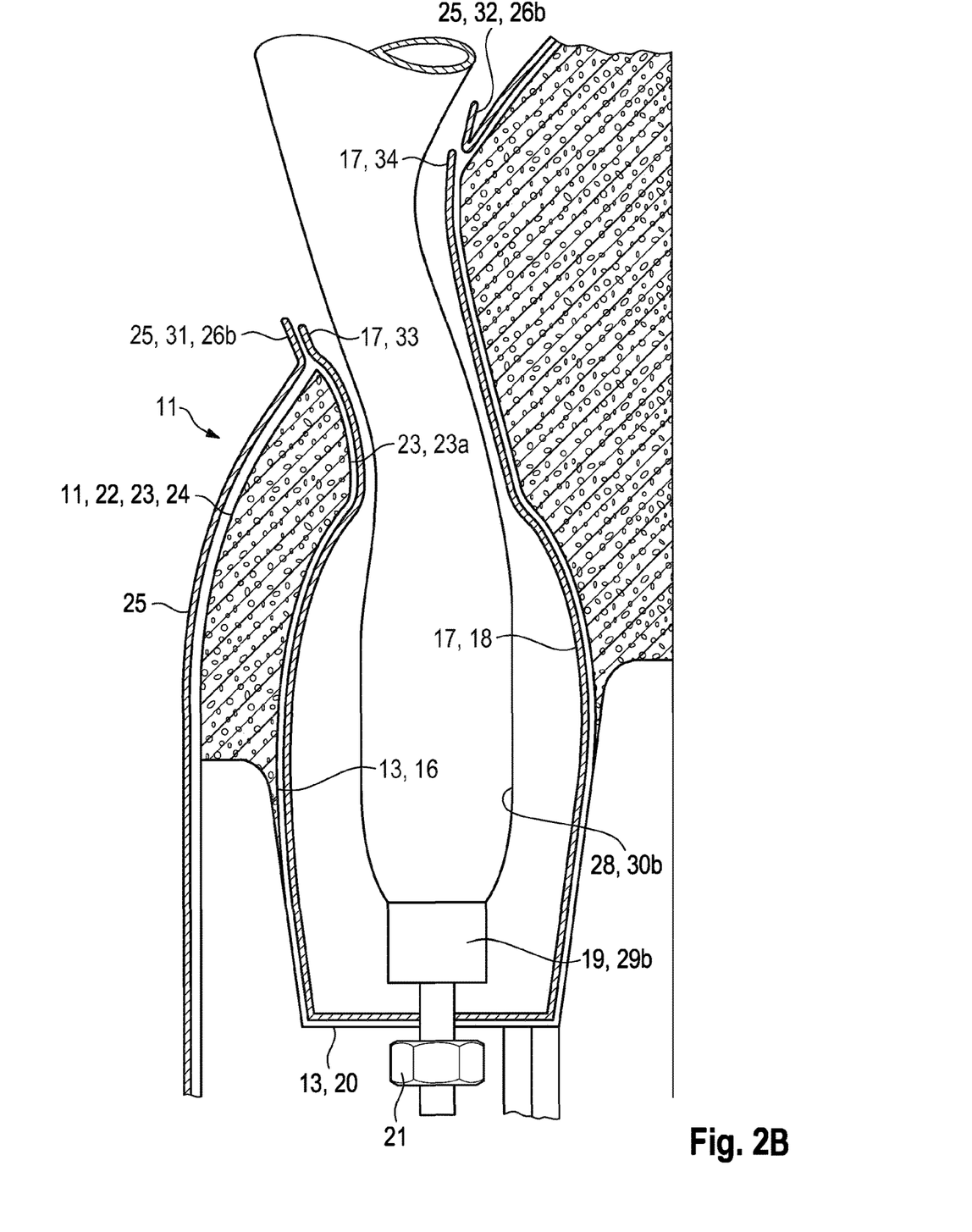

When the airbag module 19 is deployed, the airbag sack 28 passes through the passage opening 23a in the padding 23. The airbag sack 28 tears open the tearing seam 26 so that the tearing seam 26 is in the open state 26b, as is clear from the enlarged illustration in FIG. 2B. In FIGS. 2A and 2B, the airbag module 19 is shown in the activated state 29b with the airbag sack 28 in the inflated state 30b.

Figure 3:
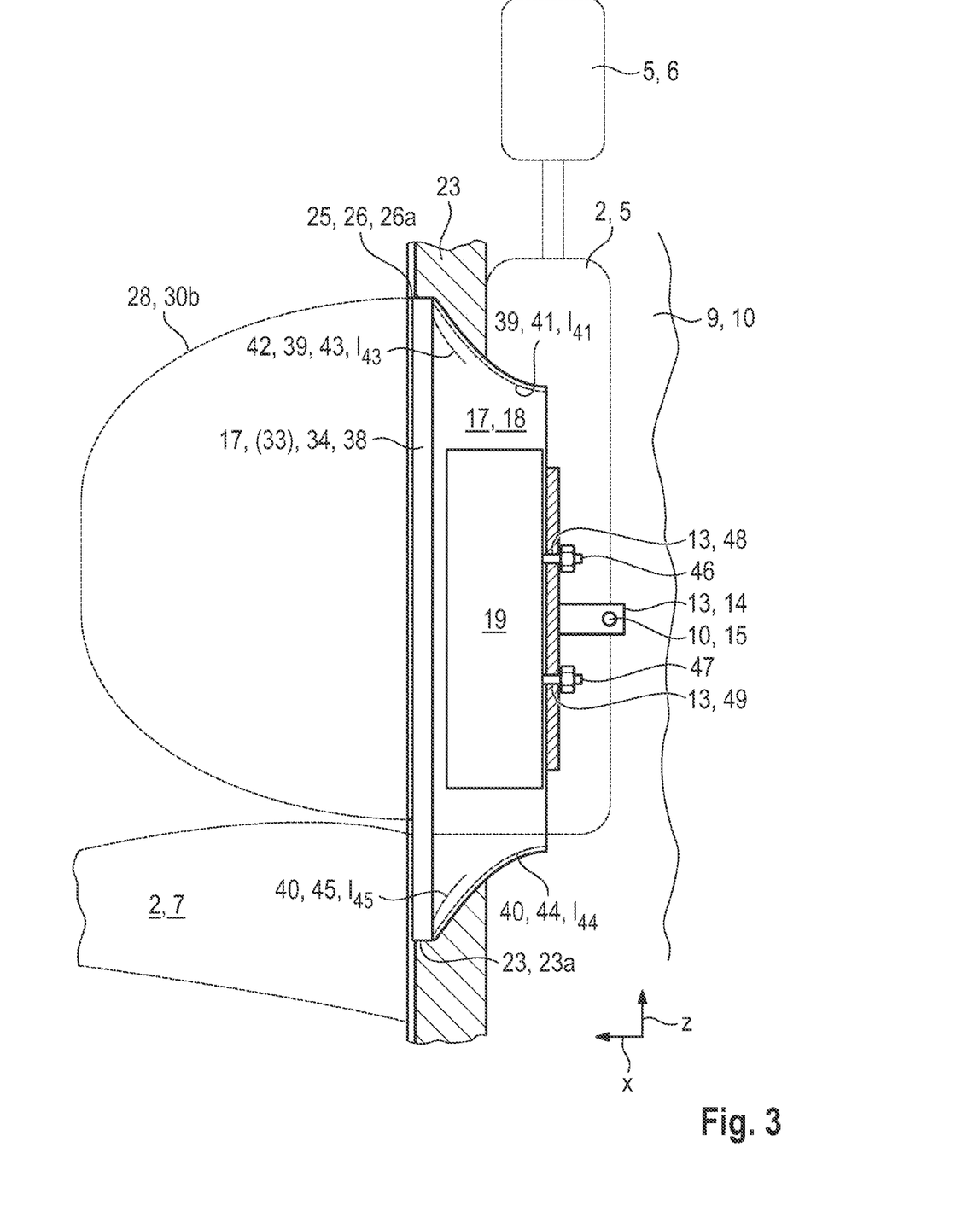
FIG. 3 is a longitudinal section through a side part arranged between a backrest of a seat and the body.

FIG. 3 shows a longitudinal section through the side part 11. A backrest 5, a headrest 6 arranged on the backrest 5, and a partially depicted seat part 7, are illustrated in dotted lines. FIG. 3 furthermore shows in dotted lines the airbag sack 28 in the inflated state 30b.

In the embodiment shown, the inflated airbag sack 28 covers the thorax of a person 8 sitting on the seat 2. In another embodiment, the inflated airbag sack 28 is designed larger so that the inflated airbag sack 28 covers the thorax and pelvis. In a further embodiment, the inflated airbag sack 28 is designed such that the inflated airbag sack 28 covers the thorax, pelvis and head.

In a further embodiment, the inflated airbag sack 28 is configured such that the inflated airbag sack 28 covers the thorax, pelvis and shoulders. In a further embodiment, the inflated airbag sack 28 is configured such that the inflated airbag sack 28 covers the pelvis.

The tearing seam 26 of the cover 25 is still in a closed state 26a. Behind the tearing seam 26 of the cover 25 are the two longitudinal edges 33, 34 of the airbag guide sack 17, which are arranged in the passage opening 23a and formed on a front longitudinal portion 38 of the airbag guide sack 17. An upper end portion 39 and a lower end portion 40 of the airbag guide sack 17 adjoin the front longitudinal portion 38 of the airbag guide sack 17.

The upper end portion 39 of the embodiment shown in FIG. 3 is completely closed by the seam 41 over the length $l_{41}$ shown in FIG. 3. In addition, a so-called sacrificial seam 43 is provided at a front end 42 of the upper end portion 39, and extends over a partial distance $l_{43}$.

In the embodiment shown, the lower end portion 40 of the airbag guide sack 17 is completely closed by a seam 44 of length $l_{44}$. A sacrificial seam 45 with length $l_{45}$ is formed at a distance from the seam 44. The sacrificial seam 45 is shorter than the seam 44 in the embodiment shown.

The length $l_{41}$ of the upper seam 41, the length $l_{43}$ of the sacrificial seam 43 spaced therefrom at the upper end portion 39, the length $l_{44}$ of the seam 44, and the length $l_{45}$ of the sacrificial seam 45 at the lower end portion 40 of the airbag guide sack 17, are shown merely as examples. Further exemplary embodiments of the seam 41, 44 and sacrificial seams 43, 45 are shown in FIGS. 4 to 8.

The airbag module 19 is arranged in the cavity 18 of the airbag guide sack 17. In the embodiment shown, two fixing means 46, 47, for example in the form of threaded bolts, are arranged on the airbag module 19. Passage openings 48, 49, through which the fixing means 46, 47 are guided, are formed in the carrier shell 13.

In FIG. 3, a fixing means 14 in the form of a tab is formed on the carrier shell 13. The tab 14 is attached to the body 10 via a fixing means 15.

Figure 4:
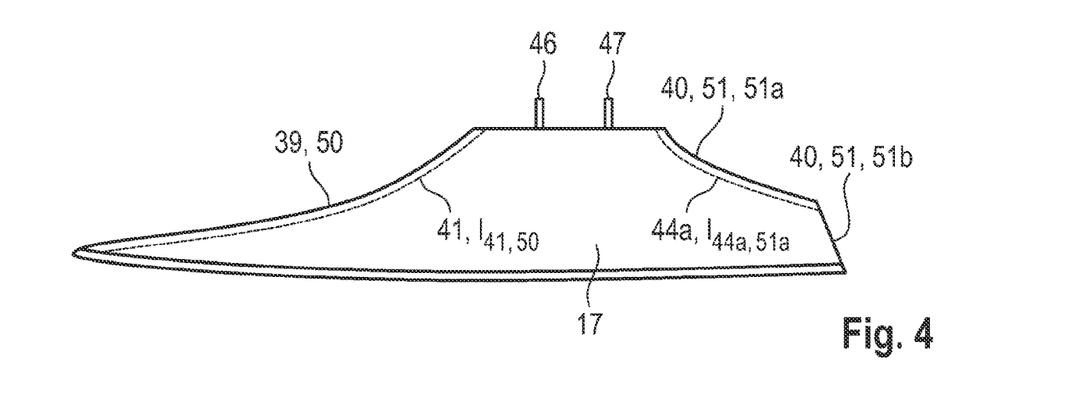
FIGS. 4 to 8 show exemplary embodiments of an airbag guide sack with different arrangements and different configurations of a seam, and in some cases different arrangements and different configurations of a sacrificial seam, on an upper opening to be closed at an upper end portion and on a lower opening to be closed at a lower end portion of the airbag guide sack.

FIG. 4 shows an embodiment of an airbag guide sack 17 in which, at the upper end portion 39, the seam 41 extends over the entire length $l_{41,50}$ of an opening 50 to be closed of the airbag guide sack 17. A sacrificial seam 43 is not provided at the opening 50 to be closed on the upper end portion 39.

In the embodiment shown, the opening 51 to be closed on the lower end portion 40 is divided into two regions 51a and 51b. The region 51b of the opening 51 remains open in the embodiment shown in FIGS. 4, 6 to 8. In FIG. 4, the region 51a of the opening 51 to be closed is provided with a seam 44a over the entire length $l_{44a,51a}$.

Figure 5:
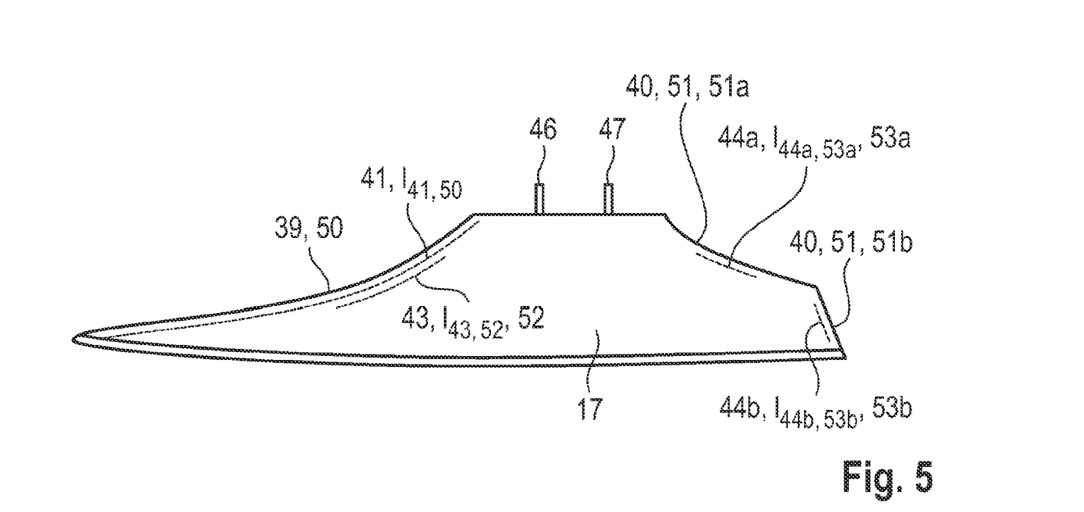

In the embodiment shown in FIG. 5, at the opening 50 to be closed on the upper end portion 39, as well as the seam 41 extending over the entire length $l_{41,50}$ as in FIG. 4, in addition a sacrificial seam 43 is provided. In the embodiment shown, the sacrificial seam 43 extends over a partial portion 52 over a length $l_{43,52}$ in a middle region of the opening 50.

At the lower end portion 40, at partial portions 53a and 53b of the opening 51 to be closed in the airbag guide seam 17, seams 44a and 44b with a respective length $l_{44a,53a}$ and $l_{44b,53b}$ are provided. The seams 44a and 44b extend over the regions 51a and 51b respectively of the opening 51. In one embodiment, the seam 44b extends over the entire length $l_{44b,51b}$ of the region 51b of the opening 51.

Figure 6:
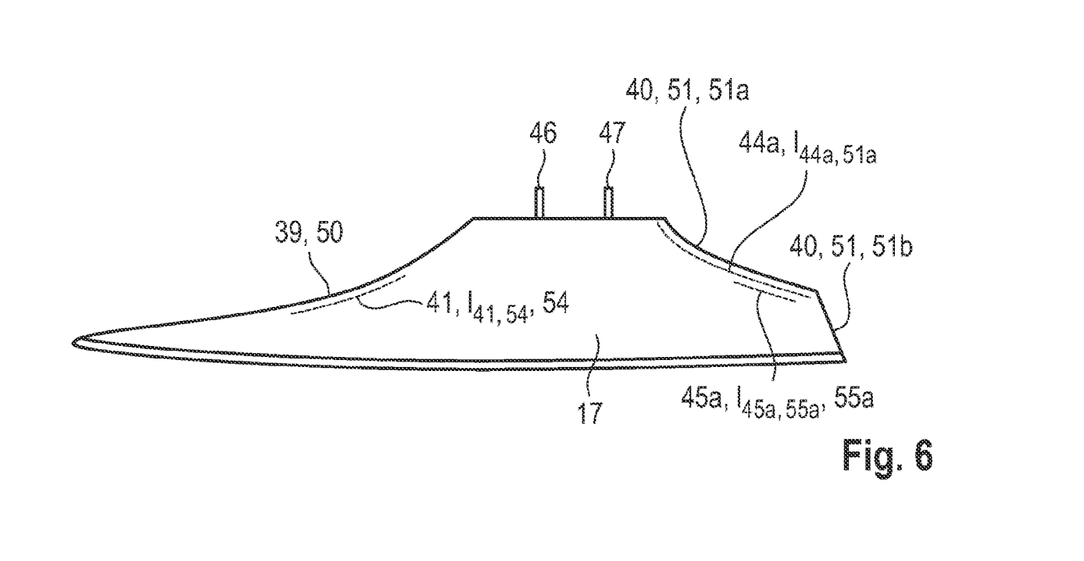

In the embodiment of FIG. 6, at the upper end portion 39, the opening 50 to be closed is provided in a partial portion 54 with a seam 41 over a length $l_{41,54}$. In the lower end portion 40, the region 51a of the opening 51 to be closed, in contrast to FIG. 4, is additionally closed with a sacrificial seam 45a in a partial portion 55a of region 51a with length $l_{45,55a}$.

Figure 7:
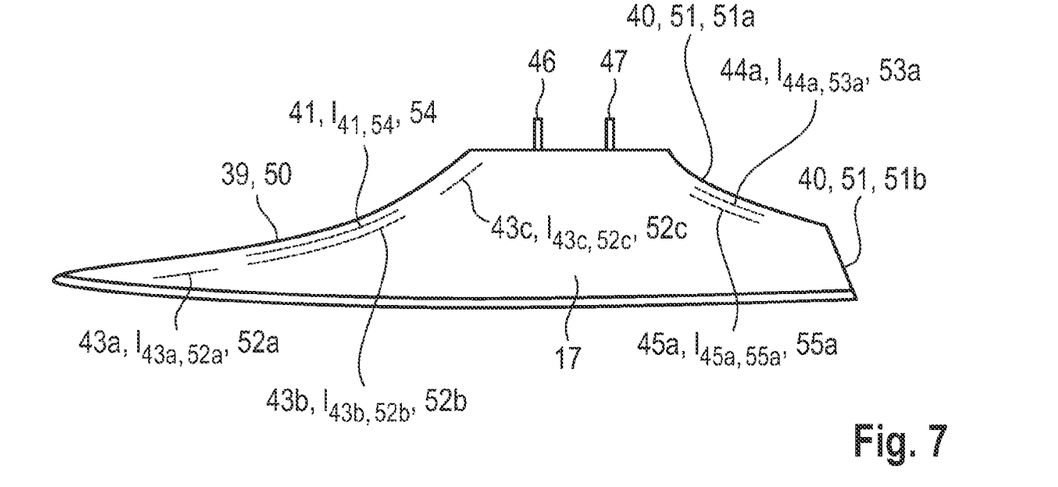

In the embodiment of FIG. 7, at the upper end portion 39 on a partial portion 54, as in FIG. 6, a seam 41 is provided with length $l_{41,54}$. In addition, three sacrificial seams 43a, 43b and 43c are formed over respective partial portions 52a, 52b and 52c of the opening 50 to be closed, and have a respective length $l_{43,52a}$, $l_{43,52b}$ and $l_{43,52c}$.

At the lower end portion 40, in FIG. 7 as in FIG. 5, at the partial region 51a of the opening 51 to be closed, over a partial portion 53a, a seam 44a is formed over a length $l_{44a,53a}$. In the embodiment shown in FIG. 7, below the seam 44a over a partial portion 55a, a sacrificial seam 45a is provided over a length $l_{45a,55a}$.

Figure 8:
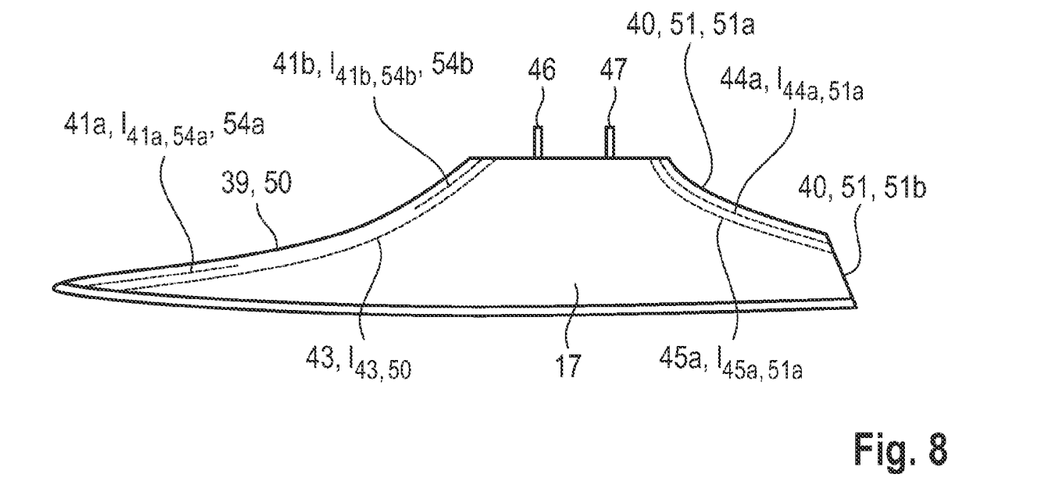

In FIG. 8, at the upper end portion 39 at two partial portions 54a and 54b, a respective seam 41a and 41b is formed with a respective length $l_{41a,54a}$ and $l_{41b,54b}$. In addition, a sacrificial seam 43 is formed over the entire length of the opening 50 to be closed, with length $l_{43,50}$.

At the lower end portion 40, as in the embodiment of FIG. 6, a seam 44a is formed over the length of the partial region 51a of the opening 51 to be closed, with a length $l_{44a,51a}$. In addition, a sacrificial seam 45a is formed over the entire length of the partial region 51a of the opening 51 to be closed, with a length $l_{45a,51a}$.

The embodiments shown in FIGS. 3, 4, 5, 6, 7, 8 are merely exemplary. Further combinations with the arrangements and embodiments shown of seams 41, 44 and sacrificial seams 43, 45 are possible.

The arrangement and design of the seams 41, 44 and/or sacrificial seams 43, 45 is such that the force loading on the foam padding 23 of the side part 11 is minimized, or the force loading on the carrier shell 13 or a comparable fixing means is minimized, or the force loading on the side part 11 is minimized.

Furthermore, the arrangement and design of the seams 41, 44 and sacrificial seams 43, 45 should prevent the airbag sack 28 from impacting on the support shell 13. Instead of the formation of seams 41, 44 and sacrificial seams 43, 45, any other suitable connection type, for example a weld connection, may be used.

In the process of production of the airbag guide sack 17, the opening 50 and/or the opening 51 may already be partially or completely closed. A suitable production process is for example the one-piece woven production process for manufacturing airbags known from US20020140218A1.

What is claimed is:

1. A motor vehicle, comprising:
    a body that forms a vehicle interior, wherein a front seat row and a rear seat row are formed in the vehicle interior;
    wherein a rear seat of the rear seat row is disposed adjacent to a side wall of the body and wherein the rear seat has a backrest;
    wherein a side part of the rear seat is disposed between the backrest and the side wall;
    an airbag module is disposed in the side part and extends approximately parallel to the backrest and at least over a length of the backrest;
    an airbag guide sack that surrounds the airbag module; and
    a carrier shell, wherein the airbag module and the airbag guide sack are fastened to the carrier shell and wherein the carrier shell is attached to the body;
    wherein a respective opening of the airbag guide sack is disposed at an upper end portion and at a lower end portion of the airbag guide sack which are partially or completely closed by a respective seam.

2. The motor vehicle according to claim 1, wherein in an inflated state of an airbag sack of the airbag module, the airbag sack covers a thorax, or the thorax and a pelvis, or the thorax and the pelvis and a head, or the thorax, the pelvis and shoulders, or the pelvis, of a person sitting on the rear seat.

3. The motor vehicle according to claim 1, wherein the respective openings are completely or partially closeable by a respective sacrificial seam.

4. The motor vehicle according to claim 1, wherein a cover is disposed on the side part and wherein a tearing seam of the cover is disposed opposite an outlet point of an airbag sack of the airbag module.

5. The motor vehicle according to claim 4, wherein the carrier shell has an opening which points in a direction of the outlet point of the airbag sack and the tearing seam of the cover.

6. The motor vehicle according to claim 1, wherein the lower end portion of the airbag guide sack is divided into a first region and a second region.

7. The motor vehicle according to claim 1, wherein the side part is attached to the body.

8. The motor vehicle according to claim 1, wherein the side part includes a padding which is covered by a cover.

9. The motor vehicle according to claim 1, wherein the airbag guide sack is made of a material corresponding to a fabric of an airbag and wherein a cover of the side part is made of a plastic material, a leather, a textile and/or a textile leather.

* * * * *